(12) United States Patent
Garfield

(10) Patent No.: US 9,545,837 B2
(45) Date of Patent: Jan. 17, 2017

(54) AUTOMOBILE BODY PROTECTOR

(71) Applicant: The Garfield Company, Inc., Burbank, CA (US)

(72) Inventor: Henry W. Garfield, Burbank, CA (US)

(73) Assignee: THE GARFIELD COMPANY, INC., Burbank, CA (US)

( * ) Notice: Subject to any disclaimer, the term of this patent is extended or adjusted under 35 U.S.C. 154(b) by 0 days.

(21) Appl. No.: 14/927,126

(22) Filed: Oct. 29, 2015

(65) Prior Publication Data

US 2016/0121706 A1  May 5, 2016

Related U.S. Application Data

(60) Provisional application No. 62/074,060, filed on Nov. 2, 2014.

(51) Int. Cl.
| | |
|---|---|
| *B60J 11/06* | (2006.01) |
| *B60R 19/42* | (2006.01) |
| *B60R 13/04* | (2006.01) |

(52) U.S. Cl.
CPC .............. *B60J 11/06* (2013.01); *B60R 13/04* (2013.01); *B60R 19/42* (2013.01)

(58) Field of Classification Search
CPC ......... B60J 11/06; B60R 19/42; B60R 13/043; B60R 13/04
USPC ................................ 293/128; 150/166, 154
See application file for complete search history.

(56) References Cited

U.S. PATENT DOCUMENTS

| | | | | | |
|---|---|---|---|---|---|
| 2,409,370 | A | * | 10/1946 | Manson | D03D 11/00 139/383 R |
| 3,704,037 | A | * | 11/1972 | Glassberg | B60J 11/06 108/46 |
| 4,014,583 | A | * | 3/1977 | Forbes | B60R 13/04 293/128 |
| 4,561,685 | A | * | 12/1985 | Fischer | B60R 13/04 280/770 |
| 4,643,471 | A | * | 2/1987 | Fishback | B60J 11/06 280/770 |
| 4,750,767 | A | * | 6/1988 | Barnett | B60J 11/06 280/770 |
| 4,896,911 | A | | 1/1990 | Duke | |
| 4,974,892 | A | * | 12/1990 | Huard | B60J 11/06 280/770 |
| 5,112,092 | A | * | 5/1992 | Pucci | B60J 5/00 280/770 |
| 5,129,695 | A | * | 7/1992 | Norman, II | B60J 11/06 280/770 |

(Continued)

FOREIGN PATENT DOCUMENTS

FR    2805220 A1 * 8/2001 ............. B60J 11/06

*Primary Examiner* — H Gutman
(74) *Attorney, Agent, or Firm* — Steinfl & Bruno LLP

(57) ABSTRACT

A device and method for protecting an automobile from dents and paint scratches caused by the opening of a door of an adjacent automobile. The protection device (cover) is formed from a plurality of rectangular pockets containing a high-density cushion material. An additional pocket includes a magnetic strip for securing the device to a metal car door or side panel. A suction cup and drawstring mechanism are attached to the top of the device for use on a window or non-metallic automobile body. The front surface of the cover is made of a ripstop material and the inner surface is made from a soft material that will not damage the automobile paint or finish.

20 Claims, 10 Drawing Sheets

(56) References Cited

U.S. PATENT DOCUMENTS

| | | | | |
|---|---|---|---|---|
| 5,456,515 A * | 10/1995 | Dang | ................. | B60J 11/025 150/166 |
| 6,062,617 A * | 5/2000 | Marks | ................. | B60J 11/06 293/128 |
| 7,404,589 B2 * | 7/2008 | Carter | ................. | B60J 11/025 296/153 |
| 7,527,320 B1 * | 5/2009 | Nevell, Jr. | ................. | B60R 19/445 293/102 |
| 2005/0218682 A1 * | 10/2005 | Klotz | ................. | B60R 5/04 296/39.1 |
| 2007/0108780 A1 * | 5/2007 | Udolph | ................. | B60R 19/42 293/128 |
| 2007/0108797 A1 | 5/2007 | Burleson | | |
| 2013/0200118 A1 * | 8/2013 | Johnson | ................. | A45C 11/00 224/246 |
| 2013/0294002 A1 * | 11/2013 | Thompson | ................. | H05F 3/00 361/212 |
| 2013/0320669 A1 * | 12/2013 | Kramer, Jr. | ................. | F16L 33/00 285/238 |
| 2015/0258880 A1 * | 9/2015 | Wheeler | ................. | B60J 11/06 293/127 |

* cited by examiner

AUTOMOBILE BODY PROTECTOR

CROSS REFERENCE TO RELATED APPLICATIONS

The present application claims the priority benefit of U.S. Provisional Application No. 62/074,060 filed on Nov. 2, 2014 for "Automobile Body Protector" by Henry W. Garfield, the contents of which are herein incorporated by reference in their entirety.

BACKGROUND OF THE INVENTION

The present invention is directed to an apparatus and method for protecting an automobile from being scratched or otherwise damaged by the car door of an adjacent automobile. More particularly, the present invention includes a multi-sectional pad configured to remain in place on an automobile such that the paint and finish of an automobile's door and side panel may be protected.

Since the invention of the automobile (for example, car, truck), automobile owners have encountered their cars being dented and scratched when parked next to another automobile. Present solutions provided by automobile manufacturers include the attaching of exterior side molding strips and edge guards positioned along the door frame. Such devices are deficient because they are dependent upon the type of automobiles (for example, different shaped door edges), force applied to open the door and the relative heights of the automobile. In addition, guards made of plastic, rubber or other material may still dent the door, scratch the paint and/or mar the finish depending upon the force of the offending door and the material used for the edge guard.

Damage for car door collisions include scratches and pitting to the painted exterior, dents and cracks in the metal, fiberglass or composite door material and damage to the trim and seals adjacent the window recesses. Such damage of this nature is not only unsightly but may reduce the value of the automobile. In addition, damage may be costly to repair; especially for luxury and high-end sports vehicles. Automobile doors and side panels are very easily damaged upon impact even at low impact velocities such as when children are opening a car door. Automobiles are especially vulnerable when parked in the tightness of space in a typical two car home garage. Typically, the automobiles are brought too closely into contact with the side of the next automobile to completely avoid contact from a fully opened door.

One known device for protecting the side of an automobile is formed from a plurality of rectangular panels connected together. The device includes hinges that lock the panels in a rigid condition along the side of an automobile, for example, in a parking lot. When not in use, the panels formed from foam rubber material can be folded, one panel onto another. The plastic panels unfold into a locked position and are mounted to the inner and outer edge of each front door using a plastic-rubber clamp. Each panel of the protector is attached to foam rubber facing the vehicle door. This known device is long, cumbersome to use, difficult to install and time consuming to disassemble.

Other known automobile body covers have hidden suction cups or other attachment devices that are difficult to remove. Moreover, such attachment devices may cause damage to the paint or finish by the user's fingernails or the device itself. Many devices are configured for use in public parking lots, requiring antitheft mechanisms. One known devices for use in a home garage is a curtain-like shield that requires significant installation hardware and is essentially a permanent structure in the garage.

Accordingly, what has been needed and not heretofore available is a device that protects the surface around the door of an automobile from damage that minimizes the denting of or chipping of paint from the sides of automobiles, is easily installed, and is quickly removable to a place of storage. In addition, it would be further desirable for this device to be made out of a durable material that will not become damaged by the force and edge of the door of an automobile. The present invention disclosed herein satisfies these and other needs.

SUMMARY OF THE INVENTION

The present invention is directed to an apparatus directed to and methods for using and making an automobile protection device and more particularly to a removable, portable, foldable rectangular cushion for protecting the doors and side panels of an automobile. The device is attachable to the outer side surface of an automobile door and other portions of the automobile body to protect the body surface from dents, scratches and marring caused by the opening of doors from adjacent automobiles.

The protection device of the present invention includes flexible rectangular panels having a resilient cushioned pad in a pocket of each panel. The three panels are constructed as a single rectangular cushion so as to provide an area effective for protection of the surface of a door and or at least a portion of a side panel. The protection device is designed especially for ease of installation and for firm retention on an outer side surface of an automobile door or side panel. The device may also be used on the rear portion of an automobile (for example, a sport utility vehicle), attaching to the front or side panels or to the windshield or a rear window.

In one aspect of the present invention, the protection device includes a plurality of panels (preferably three) connected side-by-side in stitched pockets that allow the panels to fold onto each other for ease of storage and for sales packaging. A rectangular cushion is disposed in each panel pocket (for example, a high density EVA foam rubber) material that will withstand the impact of a swinging vehicle door. The outer layer of the protection device is made of a 'ripstop' material and the inner surface is made of a non-abrasive, flannel-like (brushed, shear) material. Thus, when the device is installed on the vehicle (for example, in a multi-car garage), the opening of an automobile door adjacent thereto will not dent the automobile body, scratch the paint or mar the finish. In addition, the protection device will withstand significant abuse to its outer surface while providing an inner surface that will not damage the automobile paint or finish.

In another aspect of the invention, two attachment mechanisms are provided to retain the protection device onto the door or side panel surface. One attachment mechanism is formed from a flexible magnetic strip disposed within a pocket formed near the top portion of the cover. The magnetic strip has a length substantially the same as the side-to-side dimension of each cushioned panel so as to prevent detachment or sliding of the protection device from the door surface. The magnetic strip is magnetically attracted to a metal (steel) door surface for releasable securing the cover. A stiffening device (for example, a dowel rod) may be disposed in a pocket above or below the magnetic strip to add rigidity to the top portion of the protection device when the magnetic strip is unduly flexible.

The second attachment mechanism includes a suction cup in conjunction with a drawstring. Each end of the drawstring is secured (stitched to each top corner) to the upper portion of the protection device. The middle portion of the drawstring is formed as a loop and tightly disposed with an upper flange of the suction cup. Thus, the suction cup can be attached to a glass window or fiberglass body of the automobile. The loop portion of the drawstring is used to position the device at the appropriate height and location of the door or side panel. The suction cup may hang from the drawstring and in front of the panels of the protection device if the magnetic strip is sufficient to secure the device to the automobile.

The apparatus of the present invention includes an outer layer made of a ripstop material, an inner layer connected to the outer layer made from a flannel-like material, a first pocket formed between the outer layer and the inner layer containing a magnetic strip and at least a second pocket containing a protective material. The apparatus may further include a third pocket and a fourth pocket each containing a protective material, for example, high density EVA foam rubber. The apparatus may further include a fifth pocket containing a stiffening device, for example, a dowel rod. The apparatus may also be configured with a drawstring attached to the outer layer and the inner layer that forms a loop disposed in a raised portion of a suction cup.

A method of use of the present invention for protecting an automobile body provides a cover having five pockets formed between an outer layer and an inner layer connected to the outer layer, the outer layer being made of a ripstop material and the inner layer being made from a flannel-like material. The method uses a stiffening device, a magnetic strip, and three protective elements contained in the pockets. The cover is attached to an automobile body using the magnetic strip so that the inner layer contacts the automobile body. The method of the present invention further includes attaching the cover to an automobile body or window using a suction cup having a drawstring attached to the outer layer and the inner layer, such that a portion of the drawstring forming a loop and disposed in a raised portion of the suction cup adjusts the position of the cover on the automobile body.

A method of making an automobile body protection device of the present invention includes providing an outer layer made of a first material (for example, ripstop nylon or polyester) and connecting to the outer layer an inner layer made of a second material (for example, a flannel-like polyester). A plurality of pockets are formed between the outer layer and the inner layer. One pocket contains a magnetic strip and another may contain a stiffening device, such as a plastic or wooden dowel rod. In one embodiment, three pockets are formed to each contain a protective material. In another embodiment, a drawstring is attached to the top of the outer layer and the top of the inner layer, wherein a portion of the drawstring forming a loop is disposed in a raised portion of a suction cup.

Other features and advantages of the invention will become apparent from the following detailed description, taken in conjunction with the accompanying drawings, which illustrate, by way of example, the features of the invention.

DETAILED DESCRIPTION OF THE INVENTION

The apparatus and method of the present invention are directed to a protection device (cover) to be used in conjunction with an automobile for protecting such automobile, while parked, for instance, in a home garage, from being dented, marked, or marred by the opening of a door of an adjacent automobile. The protection device is formed from a plurality of rectangular pockets containing a cushion material. It should be understood that the panels can be of a shape other than rectangular, for example, the device may be round, oval or triangular shaped. An additional pocket includes a magnetic strip for securing the device to a metal car door or side panel. Another pocket may include an elongated stiffening mechanism, such as a wooden or plastic dowel rod. A suction cup and drawstring mechanism may be attached to the top of the protection device for use on a window or non-metallic automobile body.

Figure 1:
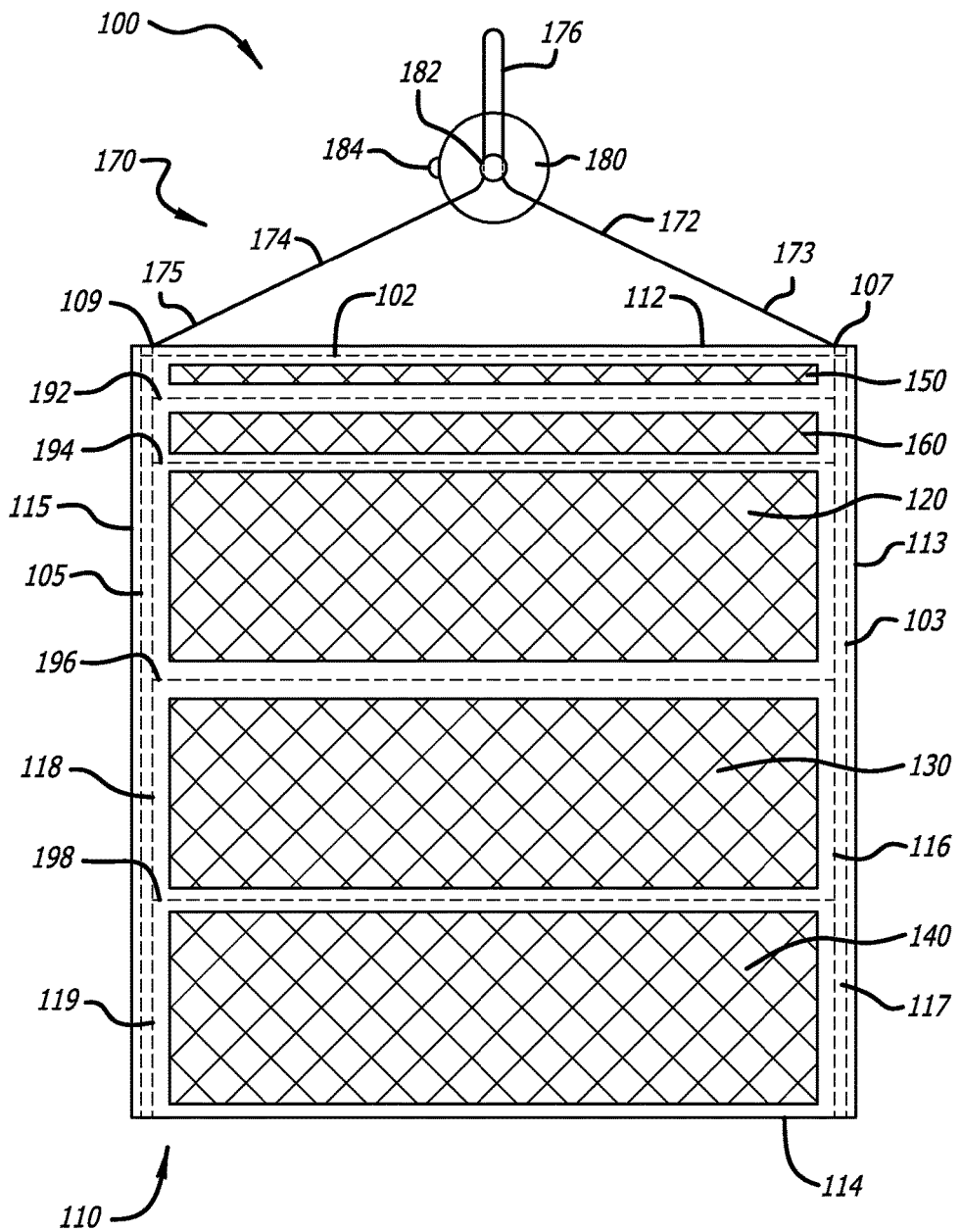
FIG. 1 is a front plan view of the protection device of the present invention.
Figure 5A:
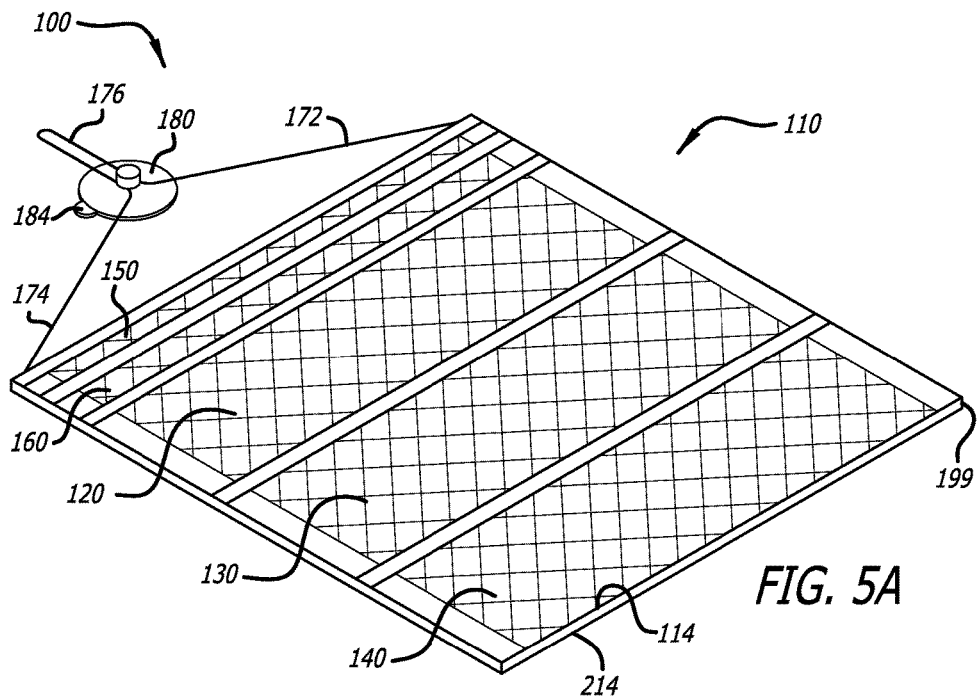
FIGS. 5A and 5B are front and back perspective views, respectively, of the protection device of the present invention.
Figure 6A:
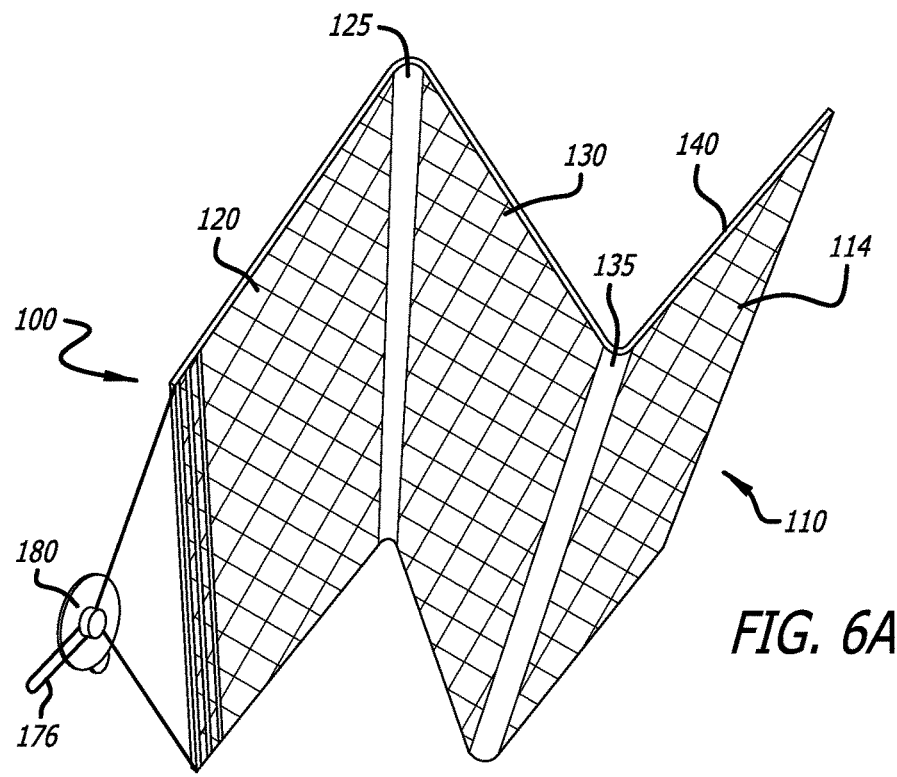
FIG. 6A is a front perspective view of the protection device of the present invention in a partially folded position.

Referring now to the drawings for purposes of illustration, where like reference numerals refer to the same elements of the invention, FIGS. 1 and 5A show the front (outer) view of the protection device 100 of the present invention. The outer body sheet 110 is formed of a material that will withstand the force of impact of a sharp door edge. Suitable materials of the outer sheet include 'ripstop' polyester or nylon, for example, seventy denier. For illustration purposes, the ripstop material is shown as a 'crosshatch pattern' in the drawings, especially in the area forming pockets 120, 130, 140, 150, 160. Although the entire outer sheet may be made from ripstop material, certain drawings do not depict a crosshatch pattern in the areas of stitching or folds (for example, the folds 125, 135 in FIG. 6A). The omission of the crosshatch pattern is for clarity of the drawings only.

The outer body sheet 110 has a top edge 112, a bottom edge 114, a right (first) side edge 113 and a left (second) side edge 115. The top edge, bottom edge, right side and left side of the outer body sheet are joined to the inner body sheet 210 (see FIGS. 2, 3 and 4) top edge 212, bottom edge 214, right (second) side 215 and left (first) side 213 by a seam formed using stitching with thread, gluing, ultrasonic welding or other suitable mechanism, technique or bonding process. Preferably, the bottom edge of the outer sheet is joined to the bottom edge of the inner sheet by a seam, for example, formed by a single closely trimmed stitching or by a inside-out stitching 199 (FIG. 4).

Figure 2:
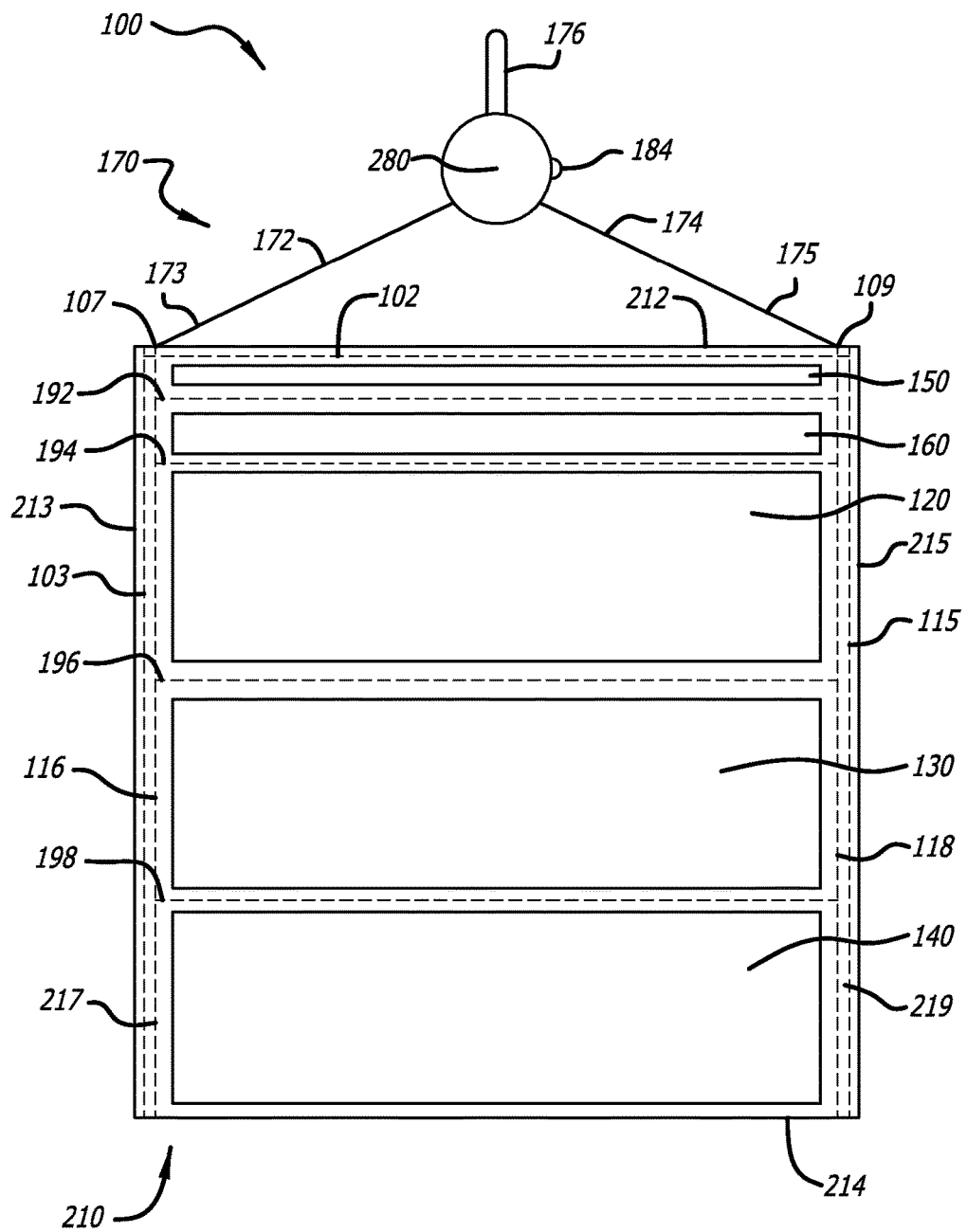
FIG. 2 is a rear plan view of the protection device of the present invention.
Figure 5B:
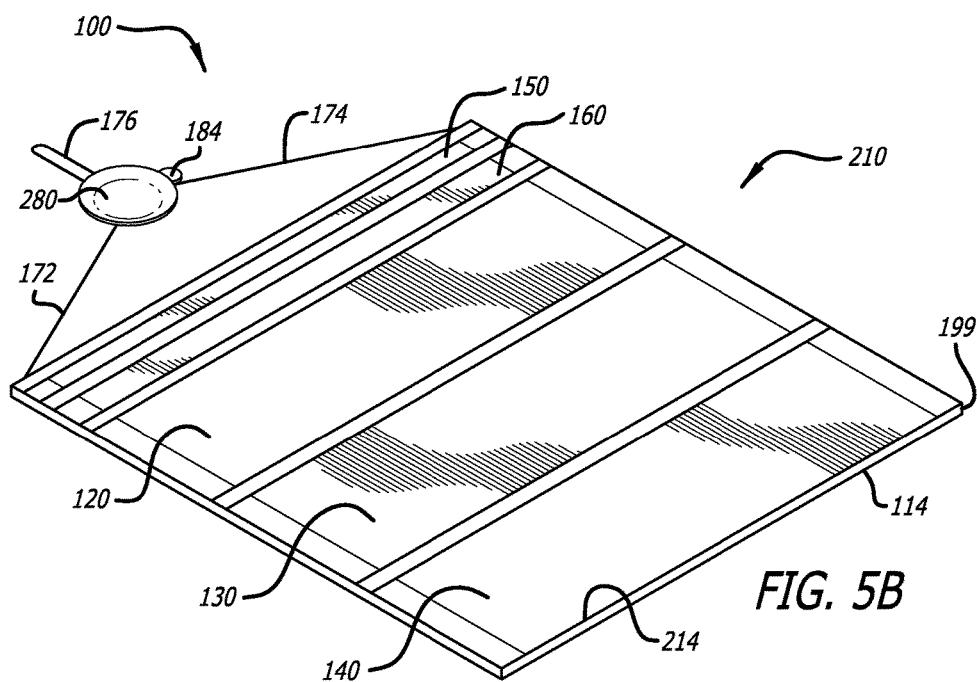

Referring also to FIGS. 2 and 5B, the back (inner) body sheet 210 is formed of a material that will not scratch the paint or mar the finish of the automobile door side panel. Suitable materials for the inner sheet include, but are not limited to, polyester (for example, eighty denier) that is flannel-like (brushed, shear), natural soft fibers and synthetic micro-fibers. Within a few millimeters of the right (first) side edge 113 of the outer sheet 110 of the protection device 100 is a first (right) vertical stitching 116 that further joins the outer sheet to the inner sheet 210. Accordingly, there is a vertical strip of material 117 between the right edge of the outer sheet and the right vertical stitching. Similarly, the first vertical stitching 116 creates a vertical strip of material 217 between the left edge 213 of the inner sheet and the first vertical stitching.

In addition, within a few millimeters of the left (second)) side edge 115 of the outer sheet 110 of the protection device 100 is a second (left) vertical stitching 118 that further joins the outer sheet to the inner sheet 210. As shown in FIGS. 1 and 5A, there is a vertical strip of material 119 between the right edge of the outer sheet and the right vertical stitching. Similarly, as shown in FIGS. 2 and 5B, the second vertical stitching 118 creates a vertical strip of material 219 between the left edge 215 of the inner sheet and the first vertical stitching.

Figure 3:
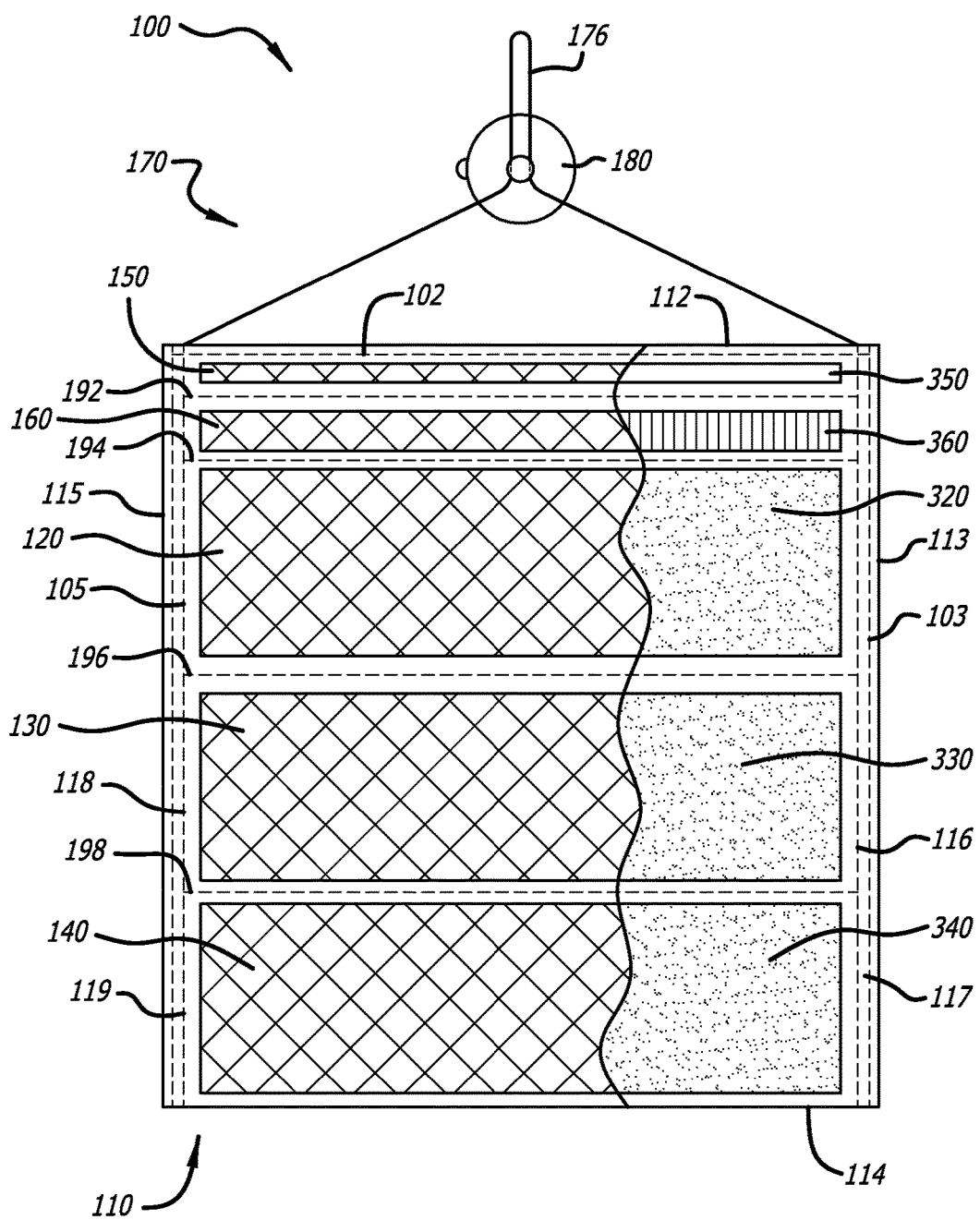
FIG. 3 is a front plan view in partial cutaway of the protection device of the present invention.
Figure 4:
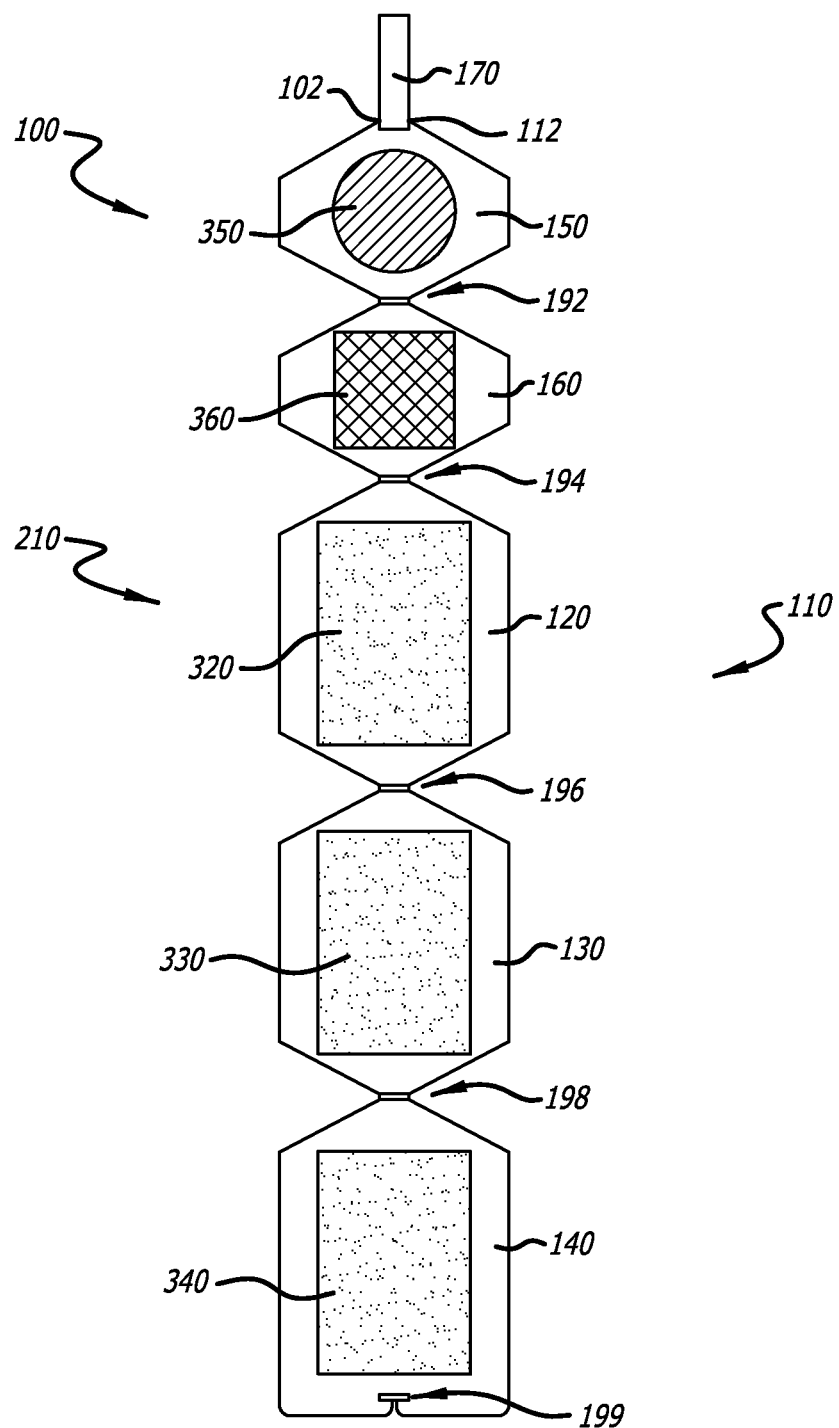
FIG. 4 is a side cross-sectional schematic of the protection device of the present invention.

Referring also to FIG. 3, three main pockets 120, 130, 140 are formed by three horizontal seams 194, 196, 198, wherein the seams may be formed by stitching with thread, gluing, ultrasonic welding or other suitable mechanism, technique or bonding process. The three main pockets each contain a cushion board 320, 330, 350 formed from high density closed cell foam (for example, ethylene vinyl acetate—EVA) or other high impact material that can withstand the force imparted by a swinging car door to prevent dents and scratches to the automobile door or side panel beneath the protection device 100. A thickness of one-sixteenth (1/16) of an inch to one-half (1/2) of an inch thick is suitable to withstand most impacts encountered from an automobile door. Each cushion board may vary in length and width, preferable about seventeen inches from side-to-side and five and one-half inches high. The total height of the outer and inner sheets 110, 210 from top edge 112, 212 to bottom edge 114, 214 is preferably nineteen inches, and the width is eighteen inches. The thickness of the cushion board helps prevent the stitching from contacting the automobile body on the inner (back) side 210 along the seams, outer edges and folds of the protection device 100.

As schematically shown in FIG. 4, each seam (see folds 125, 135 in FIG. 6A) forms a trough that prevents the bond material from contacting the automobile body, further preventing scratching and marring of the paint and finish.

Because stitching with thread, gluing, ultrasonic welding or other bonding process involves the joining of only the two exterior layers of material 110, 210, the bond material does not penetrate the inner layer of high density material. Accordingly, the surface of each seam is recessed and not beyond the overall thickness, inside or outside, of the protection device (cover) in total. Providing a recessed bond, such as a stitched thread, in the seam also safeguards against damage caused by possible product design flaw to either car's body parts when contact is made (see FIG. 6F).

Figure 6B:
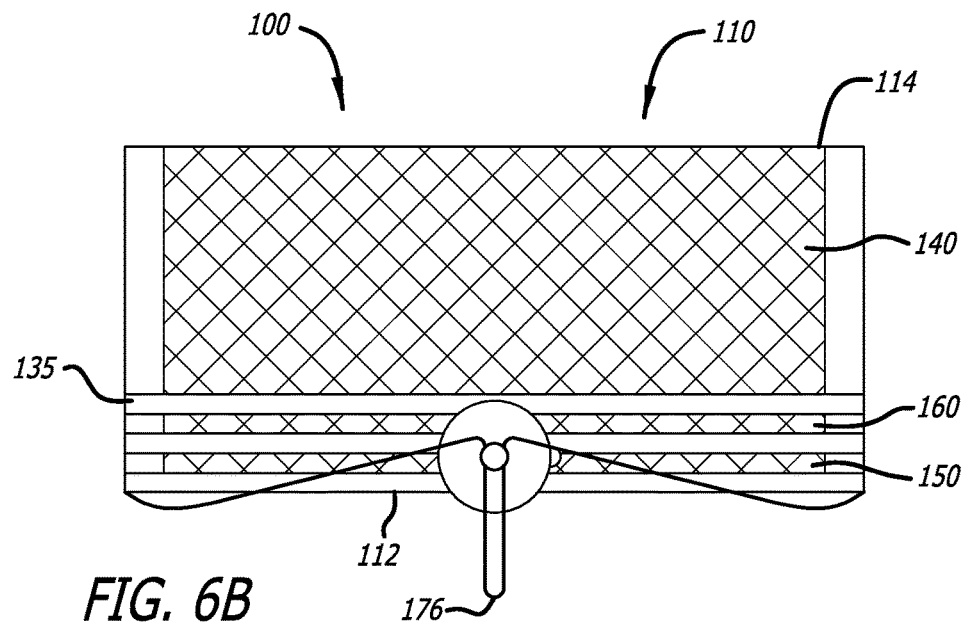
FIGS. 6B and 6C are front and back plan views, respectively, of the protection device of the present invention in a fully folded position.
Figure 6C:
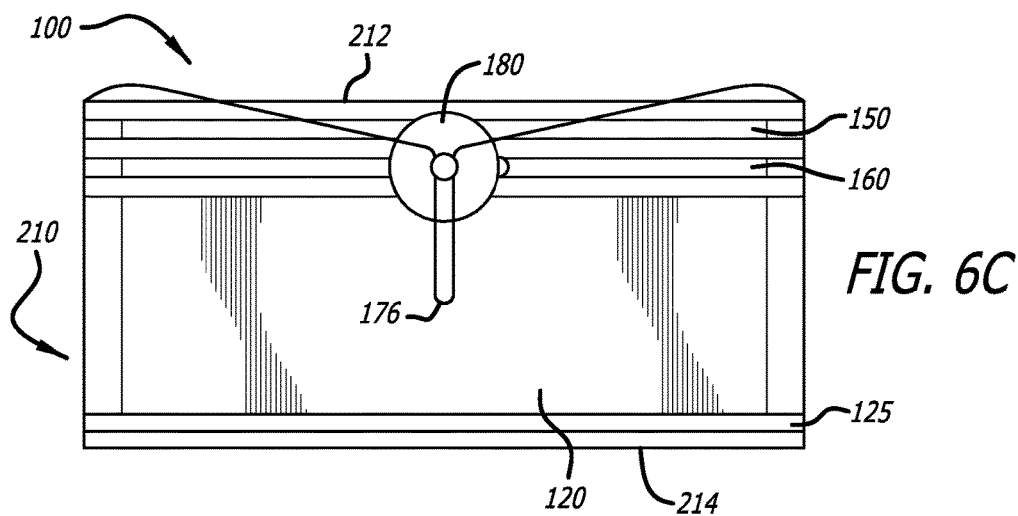

The stitching and pockets are purposefully designed so that the protection device may be folded in sections like a "W" (see FIG. 6A) and then collapsed into a configuration where each pocket and cushion rest on top of each other for minimal width and ease of storage (see FIGS. 6B and 6C). The configuration of the stitching, pockets and cushions is depicted in FIG. 4.

Two additional pockets 150, 160 may be formed by a fourth seam 192 positioned just below the top edge 112 of the protection device 100. The topmost pocket 150 may contain a dowel rod 350 (FIGS. 3 and 4) formed from wood or plastic or other suitable material to provide a moderate stiffening of the top portion of the cover. The grasping pocket 160 formed just below the topmost pocket is used to retain a flexible magnetic strip for securing the protective cover to a metal car door or side panel (see FIGS. 8, 13). The magnetic strip should be "one sided" so as to not attract objects on the outside of the cover. The strength of the magnetic strip must be sufficient to hold the weight of the protection device. Suitable magnetic strips may made of a Ferro magnetic powder mixed with a polymer bonding, for example, in the range of one thirty-second (1/32) to one quarter (1/4) of an inch in thickness, and preferably one sixteenth (1/16) of an inch thick. Such strips are available from a variety of suppliers, such as under the brand name MAG-MATE from Industrial Magnetics, Inc. of Boyne City, Mich.

Figure 7A:
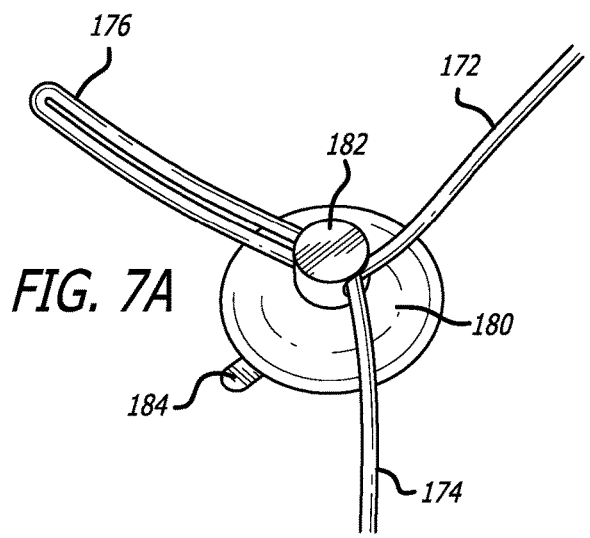
FIGS. 7A and 7B are front and back perspective views, respectively, of the suction cup and draw string portions of the protection device of the present invention.
Figure 7B:
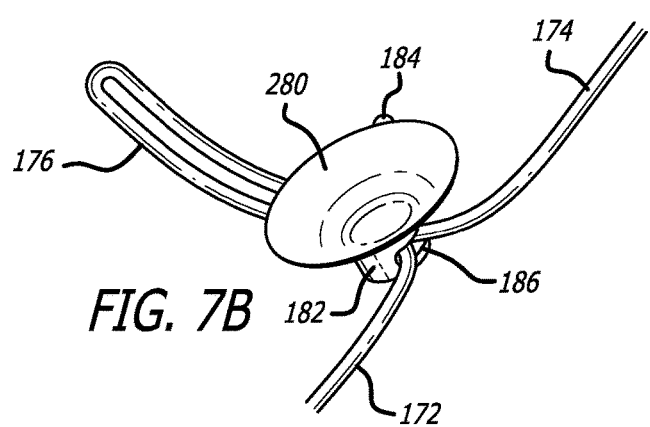

A second attachment mechanism configured as part of the protection device 100 of the present invention includes a drawstring and suction cup. As shown in FIGS. 1, 7A and 7B, the suction cup is formed with a round main body 180 and central round, raised knob 182 to slidably retain a drawstring 170. The suction cup has a tab (small knob or flange) 184 formed near the edge of the suction cup for releasing the cup when attached to a surface, such as a window, door or side panel. As shown in FIGS. 2, and 7B, the underside 280 of the cup is smooth and concave. The suction cup is preferably made of surgical grade vinyl so as to not affect the paint or finish. A suitable suction cup is a medium-sized PVC "mushroom head" available from Popco, Inc. of Minnetonka, Minn. (model SCM-177).

Referring also to FIGS. 9, 10, 11 and 12, the drawstring 170 has two side sections 172, 174 attached to the top 112 of the protection device 100. Each end portion 173, 175 of the drawstring sides are disposed and secured under the seam (stitching) in pockets 107, 109 at the top edges 112, 212 of the inner sheet 110 and outer sheet 210. In one embodiment, the drawstring ends are positioned between the upper seam and the first stitching 192 that forms the pocket 150 for the dowel rod 350. Each end of the drawstring is stitched or otherwise secured to the top corners of the protection device. Each end of the drawstring is secured near the sides 113, 213, 115, 215 of the cover so as to form an adjustable length triangle (see FIG. 10). from the suction cup to the upper corners of the protection device. One suitable drawstring material is non-brushed polyester.

The middle of the drawstring 170 forms a loop 176 that is tightly disposed within a passage 186 (FIG. 7B) in the raised knob 182 of the suction cup 180. The drawstring passage may be formed when the suction cup and knob are molded, or after production by drilling or melting, for example, by using a hot tip of a soldering iron. Importantly, the diameter of the passage should be configured to compress the two sides of the drawstring together for a tight fit within the passage. Accordingly, when the drawstring loop is pulled as a unit, the distance of between the suction cup and cover is shortened. Similarly, one or both of the drawstring sides 172, 174 can be pulled separately through the suction cup passage to adjust the cover to it rests at an angle to the ground (see FIG. 12).

Figure 8:
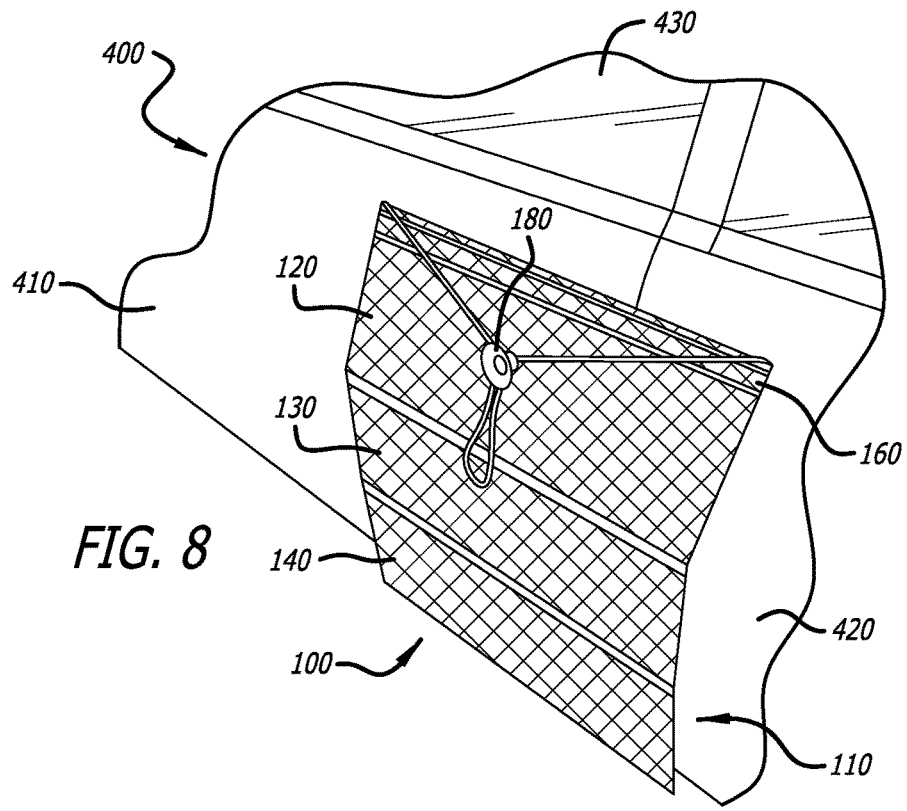
FIG. 8 is a schematic representation depicting the protection device of the present invention attached on an automobile using the magnetic strip.
Figure 9:
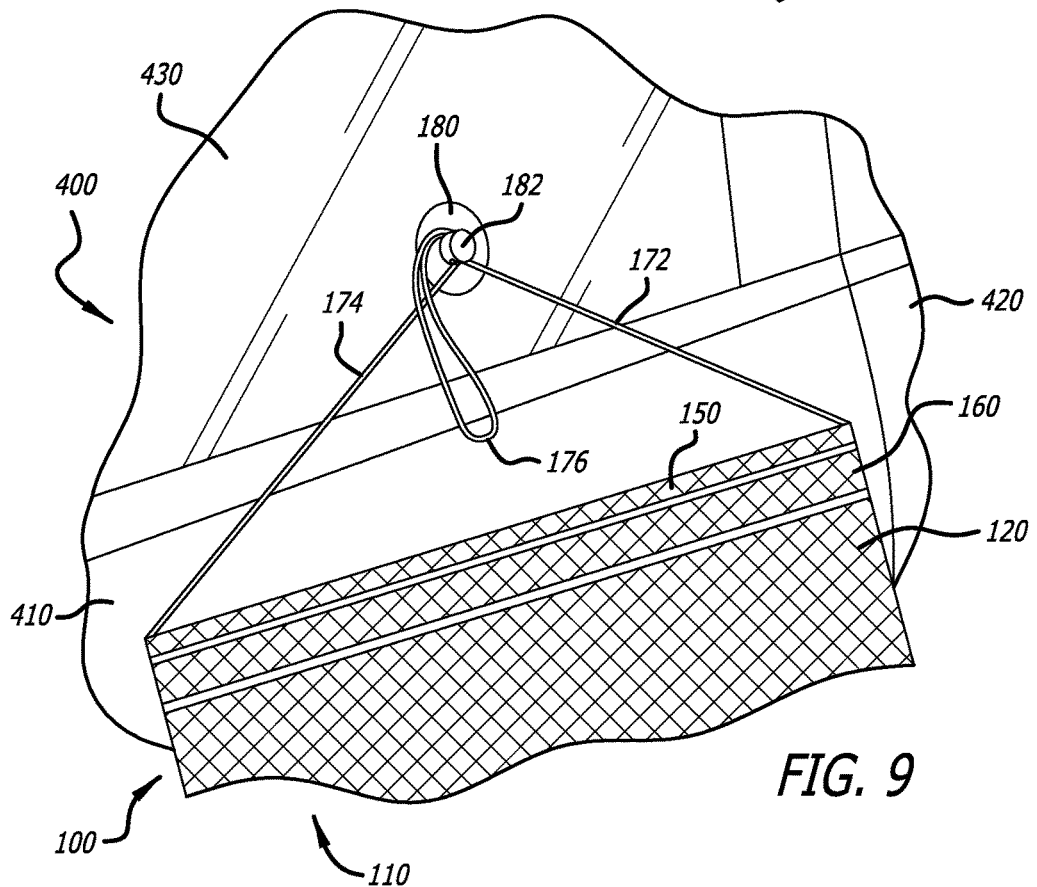
FIG. 9 is a schematic representation depicting the protection device of the present invention attached on an automobile using the suction cup.
Figure 10:
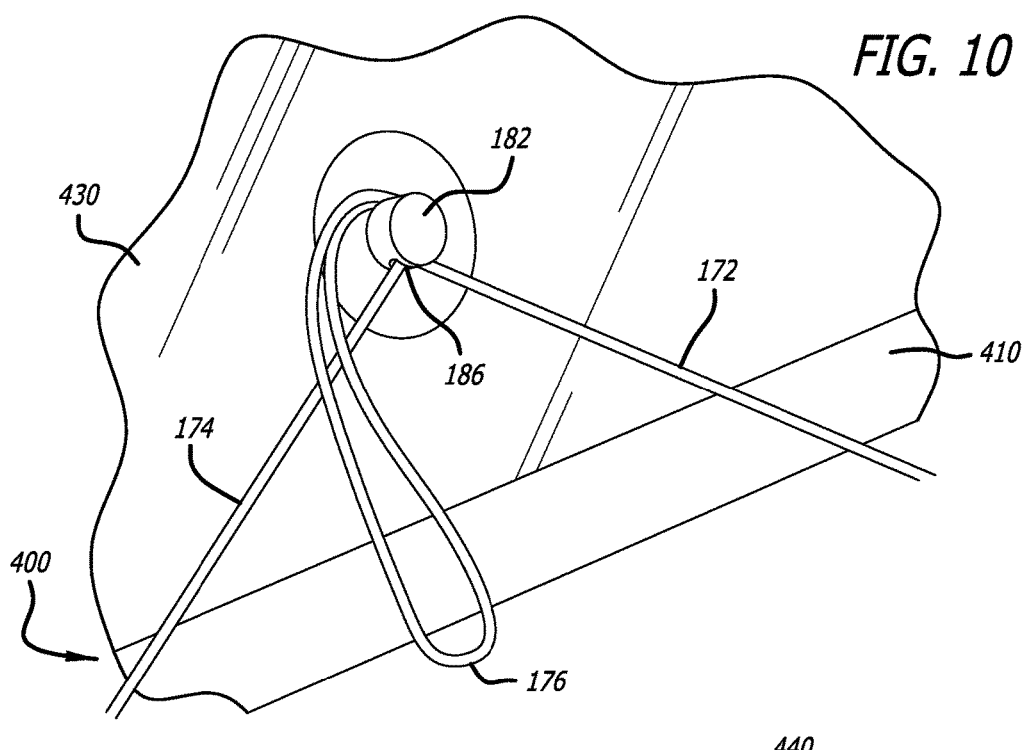
FIG. 10 is a partial perspective view of a suction cup of the protection device attached to an automobile window in accordance with the present invention.
Figure 11:
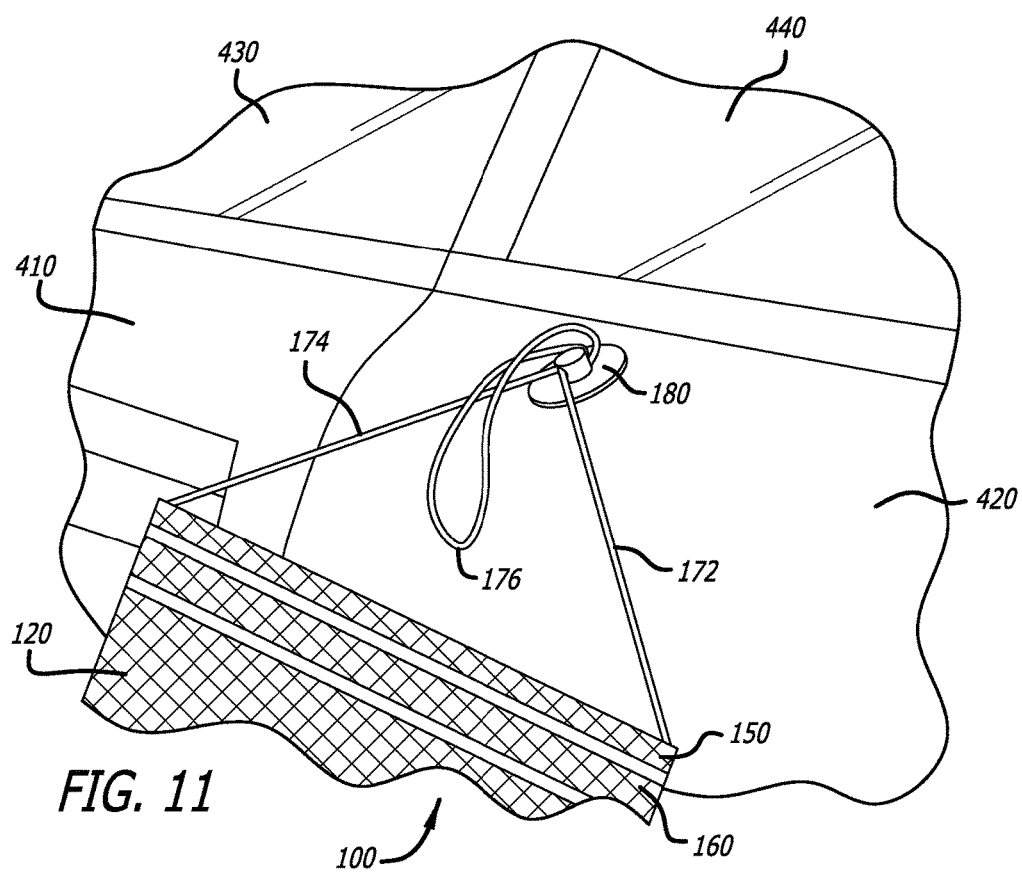
FIG. 11 is a partial perspective view of a suction cup with the protection device attached to an automobile body panel in accordance with the present invention.
Figure 12:
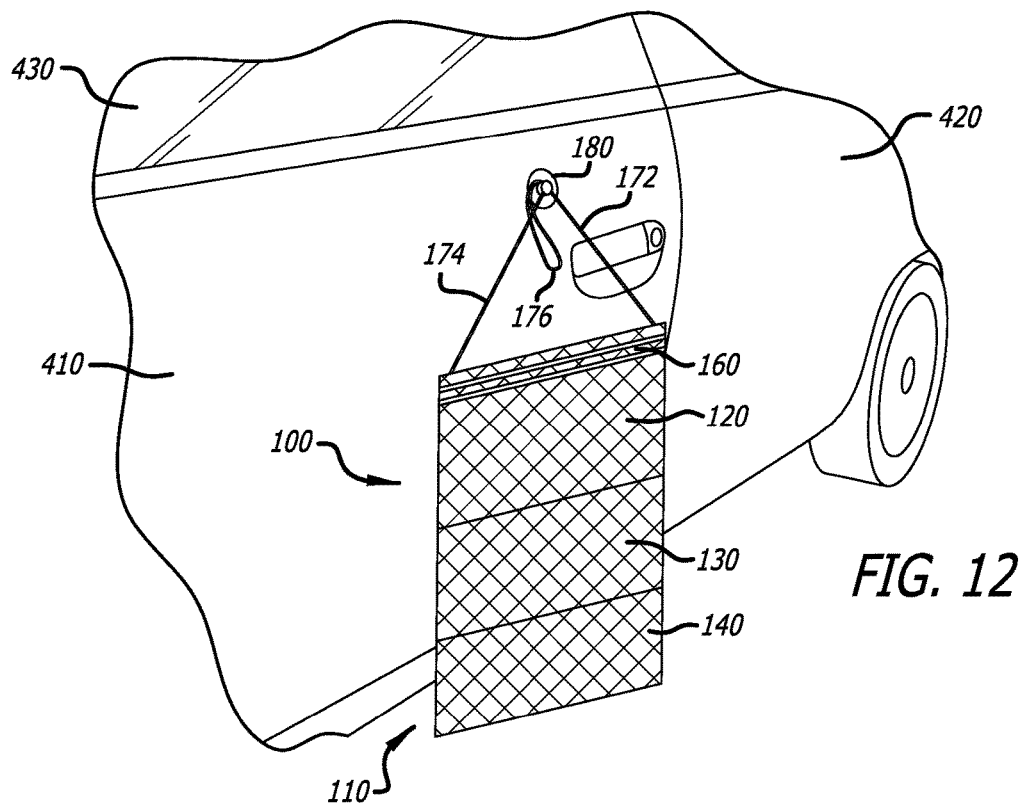
FIG. 12 is a perspective view of protection device attached to an automobile door using the suction cup in accordance with the present invention.
Figure 13:
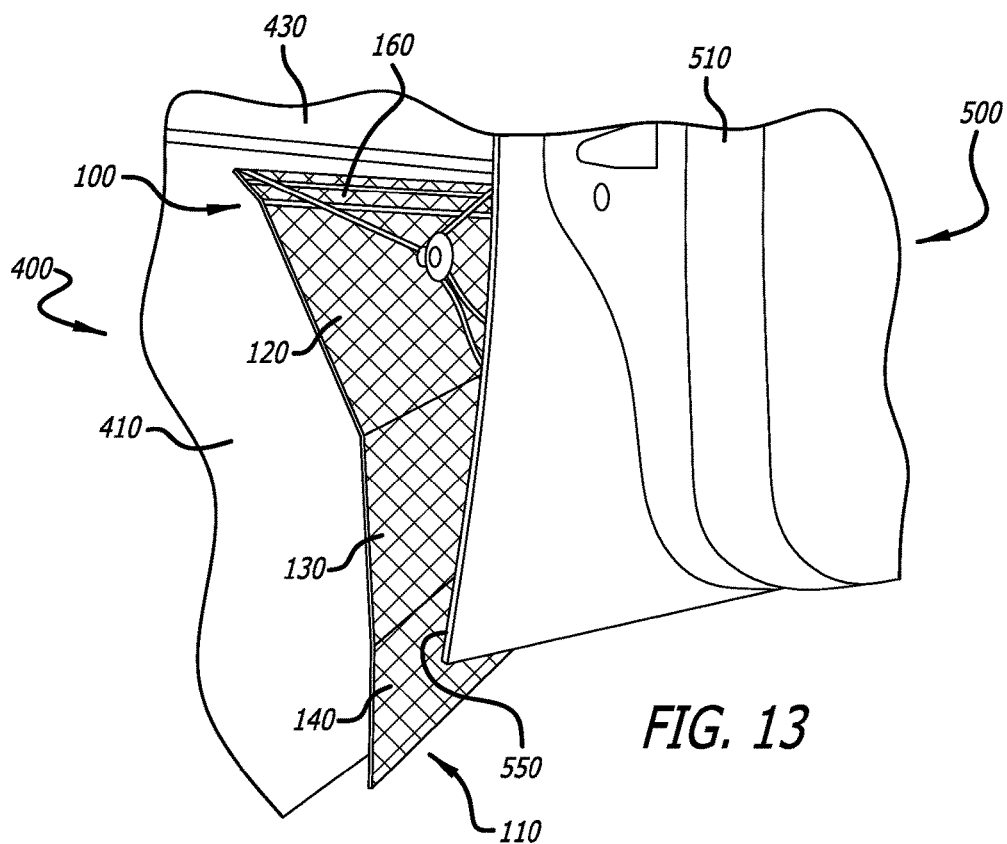
FIG. 13 is a perspective view of protection device attached to an automobile door using the magnetic strip in accordance with the present invention, wherein another automobile door is touching the protection device.

In accordance with the methods of use of the present invention, FIGS. 8-13 show the protection device 100 removably attached to an automobile 400 (for example, car, sport utility vehicle or truck). As shown in FIG. 8, the cover may be attached directly to the metal body of a car by the magnetic strip 360 in pocket 160. Alternatively, the suction cup 180 may be attached to a window 430, 440 of the automobile when the body is not made of metal, for example, fiberglass (FIGS. 9 and 10). Further, the suction cup may be attached to the car door 410 (FIG. 12) or body panel 420 (FIG. 11) and the drawstring adjusted for the proper height (FIGS. 12 and 13).

Referring now to FIG. 13, the method of using the protection device 100 of the present invention is shown with a first automobile 400 parked adjacent a second automobile 500. the grasping (magnetic) pocket 160 secures the cover panels 120, 130, 140 against the door 410 of the first automobile. Note that the suction cup 180 could alternatively be attached to the window 430 of the first automobile to retain the cover against the door or body panel, as shown in FIG. 12. Importantly, when the door 510 of the second automobile is opened, the bottom corner (edge) 550 contacts the outer (front) cover 110 and bottom cushioned pocket 140. The cushioned pocket prevents (or significantly limits) a scratch or dent to the door or body panel of the first automobile. Similarly, middle cushioned pocket 130 can bear the force of the middle of the second car door and the top cushion 120 will protect the first car from a protruding door handle.

Generally, the three cushioned panels 120, 130, 140 will absorb the force from the second automobile door 510 against the first automobile body/door 410 no matter what size or shape of the impinging door. Meanwhile, the soft inner (back) layer 210 (see FIG. 2) of the protection device of the present invention will prevent scratching or marring of the paint finish on the first automobile 400 caused by the impact from the second automobile 500. The ripstop material on the outer (front) side of the protection device will also limit damage (tears, cuts) to the cover that may be caused by sharp or pointed edges of the opened door. This unique combination of a strong (ripstop) outer sheet, cushioned pockets and a soft (plush) inner sheet provides easy to use and cost effective protection heretofore unknown in the automotive industry.

The examples set forth above are provided to those of ordinary skill in the art as a complete disclosure and description of how to make and use the embodiments of the disclosure, and are not intended to limit the scope of what the inventor/inventors regard as their disclosure. Modifications of the above-described modes for carrying out the methods and systems herein disclosed that are obvious to persons of skill in the art are intended to be within the scope of the following claims.

It is to be understood that the disclosure is not limited to particular devices, methods or systems, which can, of course, vary. It is also to be understood that the terminology used herein is for the purpose of describing particular embodiments only, and is not intended to be limiting. As used in this specification and the appended claims, the singular forms "a," "an," and "the" include plural referents unless the content clearly dictates otherwise. The term "plurality" includes two or more referents unless the content clearly dictates otherwise. Unless defined otherwise, all technical and scientific terms used herein have the same meaning as commonly understood by one of ordinary skill in the art to which the disclosure pertains.

Other features and advantages of the present invention may become apparent from the description of the invention herein when taken in conjunction with the accompanying exemplary drawings. Further modifications and improvements may additionally be made to the system and methods disclosed herein without departing from the scope of the present invention. Accordingly, it is not intended that the invention be limited by the embodiments disclosed herein.

What is claimed is:

1. An apparatus, comprising:
    an outer layer;
    an inner layer connected to the outer layer;
    a first pocket formed between the outer layer and the inner layer, the first pocket containing a stiffening device;
    a second pocket formed between the outer layer and the inner layer, the second pocket containing a magnetic strip, wherein a first seam forms a trough between the first pocket and the second pocket;
    a third pocket formed between the outer layer and the inner layer, the third pocket containing a protective material, wherein a second seam forms a trough between the second pocket and the third pocket;
    a fourth pocket formed between the outer layer and the inner layer, the fourth pocket containing a protective material, wherein a third seam forms a trough between the third pocket and the fourth pocket; and
    a fifth pocket formed between the outer layer and the inner layer, the fifth pocket containing a protective material, wherein a fourth seam forms a trough between the third pocket and the fourth pocket.

2. The apparatus of claim 1, wherein the outer layer is made of a ripstop material and the inner layer is made from a flannel-like material.

3. The apparatus of claim 1, wherein each seam is recessed so as to not extend beyond an outer surface of the inner layer.

4. The apparatus of claim 1, wherein the protective material in each of the third pocket, fourth pocket and fifth pocket is a high density foam.

5. The apparatus of claim 1, wherein the stiffening device is a dowel rod.

6. The apparatus of claim 1, further including a drawstring having a first end and a second end, wherein each end is attached to the outer layer and the inner layer; and further including a suction cup having a portion of the drawstring that forms a loop disposed in a raised portion of the suction cup.

7. A method for protecting an automobile body, comprising:
    providing a cover, including
        an outer layer made of a ripstop material,
        an inner layer made from a flannel-like material and being connected to the outer layer, a first pocket formed between the outer layer and the inner layer, the first pocket containing a stiffening device, a second pocket formed between the outer layer and the inner layer, the second pocket containing a magnetic strip, wherein a first seam forms a trough between the first pocket and the second pocket, a third pocket formed between the outer layer and the inner layer, the third pocket containing a protective material, wherein a second seam forms a trough between the second pocket and the third pocket, a fourth pocket formed between the outer layer and the inner layer, the fourth pocket containing a protective material, wherein a third seam forms a trough between the third pocket and the fourth pocket, and a fifth pocket formed between the outer layer and the inner layer, the fifth pocket containing a protective material, wherein a fourth seam forms a trough between the third pocket and the fourth pocket; and attaching the cover to an automobile body,
wherein the inner layer contacts the automobile body, and
wherein each seam is recessed so as to not extend beyond an outer surface of the inner layer.

8. The method of claim 7, wherein attaching the cover to an automobile body includes using the magnetic strip to secure the cover to the automobile body.

9. The method of claim 7, further including providing a drawstring having a first end and a second end, wherein each end is attached to the outer layer and the inner layer; further including providing a suction cup having a portion of the drawstring that forms a loop disposed in a raised portion of the suction cup; wherein attaching the cover to an automobile body uses the suction cup instead of the magnetic strip.

10. The method of claim 9, further including attaching the suction cup to a window or body panel of the automobile body.

11. The method of claim 9, further including using the drawstring to adjust the position of the cover on the automobile body.

12. A method of making an automobile body protection device, comprising:
providing an outer layer made of a first material;
connecting an inner layer made of a second material to the outer layer;
forming a first pocket formed between the outer layer and the inner layer, the first pocket containing a stiffening device;

forming a second pocket between the outer layer and the inner layer, the second pocket containing a magnetic strip, wherein a first seam forms a trough between the first pocket and the second pocket;

forming a third pocket between the outer layer and the inner layer, the third pocket containing a protective material, wherein a second seam forms a trough between the second pocket and the third pocket;

forming a fourth pocket between the outer layer and the inner layer, the fourth pocket containing a protective material, wherein a third seam forms a trough between the third pocket and the fourth pocket; and forming a fifth pocket between the outer layer and the inner layer, the fifth pocket containing a protective material, wherein a fourth seam forms a trough between the third pocket and the fourth pocket.

13. The method of making an automobile body protection device of claim 12, wherein each seam is recessed so as to not extend beyond an outer surface of the inner layer.

14. The method of making an automobile body protection device of claim 12, wherein the forming a first pocket includes using a dowel rod as the stiffening device.

15. The method of making an automobile body protection device of claim 12, further comprising:
providing a drawstring having a first end and a second end;
attaching the first end and the second end of the drawstring to the outer layer and the inner layer; and
providing a suction cup having a portion of the drawstring forming a loop disposed in a raised portion of the suction cup.

16. The method of making an automobile body protection device of claim 12, wherein providing an outer layer made of a first material includes using a ripstop material for the outer layer.

17. The method of making an automobile body protection device of claim 12, wherein connecting an inner layer made of a second material to the outer layer includes using a flannel-like material for the inner layer.

18. The method of making an automobile body protection device of claim 16, wherein using a ripstop material for the outer layer includes using nylon or polyester.

19. The method of making an automobile body protection device of claim 18, wherein using nylon or polyester includes using fibers of seventy denier.

20. The apparatus of claim 6, wherein the suction cup further includes a tab configured for releasing the suction cup when attached to a surface.

* * * * *